United States Patent [19]
Scheiter

[11] 3,713,353
[45] Jan. 30, 1973

[54] TRANSMISSION

[75] Inventor: Milton H. Scheiter, Bloomfield Hills, Mich.

[73] Assignee: General Motors Corporation, Detroit, Mich.

[22] Filed: Feb. 3, 1971

[21] Appl. No.: 112,246

[52] U.S. Cl. ..........................74/730, 74/677, 74/691
[51] Int. Cl......F16h 47/00, F16h 47/08, F16h 37/06
[58] Field of Search........74/730, 732, 677, 691, 199, 74/200

[56] References Cited

UNITED STATES PATENTS

| | | | |
|---|---|---|---|
| 2,181,380 | 11/1939 | Pollard | 74/691 |
| 2,646,696 | 7/1953 | Kepes | 74/691 |
| 2,890,600 | 6/1959 | Smirl et al. | 74/677 |
| 2,897,689 | 8/1959 | Waclawek | 74/677 X |
| 3,073,181 | 1/1963 | Kronograd | 74/677 |
| 3,073,182 | 1/1963 | Harmon | 74/677 |
| 3,075,408 | 1/1963 | Chapman et al. | 74/677 |
| 3,394,617 | 7/1968 | Dickenbrock | 74/730 |

*Primary Examiner*—Arthur T. McKeon
*Attorney*—Warren E. Finken, A. M. Heiter and John P. Moran

[57] ABSTRACT

A combined fixed ratio planetary traction-drive and toric roller transmission, including a fluid torque converter wherein, in one embodiment, the power input is split at the impeller, with a portion thereof being directed through the planetary drive to overdrive the input race of the toric roller section, thereby reducing torque into the toric section and, consequently, reducing the size requirements of the toric section. The output from the output race is directed to a stator having no overrunning clutch, to rotate the stator in a direction opposite to that of the impeller and turbine. Such external control of the relative speeds of the stator and impeller provides improved converter torquel-speed ratio characteristics. Reaction for the sun member and the roller support is through a nonrotating axial loader mechanism to the casing. A second embodiment utilizes a conventional torque converter stator and overrunning clutch arrangement downstream of the above-described planetary-toric drive, along with the above-described nonrotating axial loader mechanism and means for reducing torque into the toric section.

9 Claims, 5 Drawing Figures

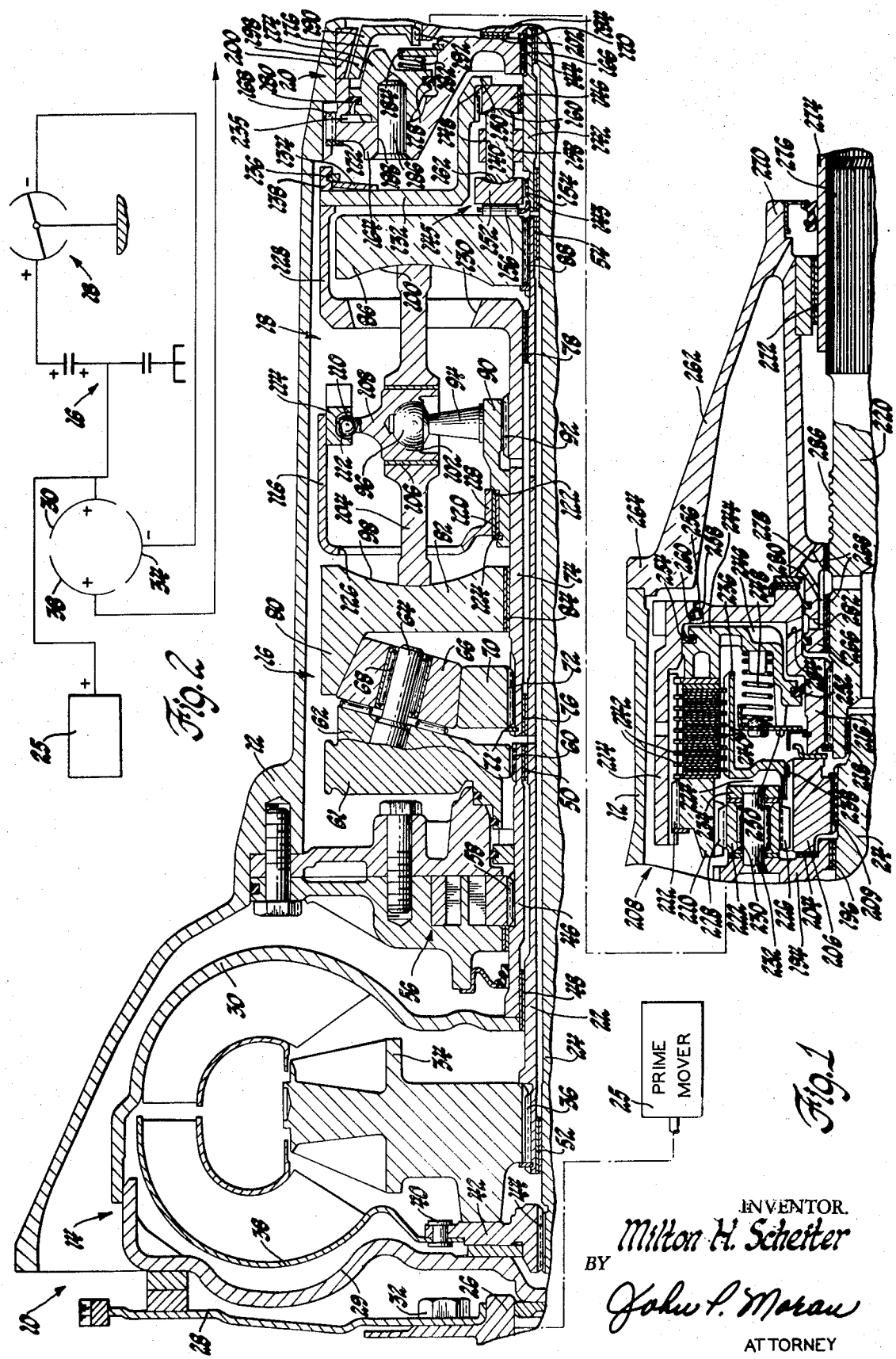

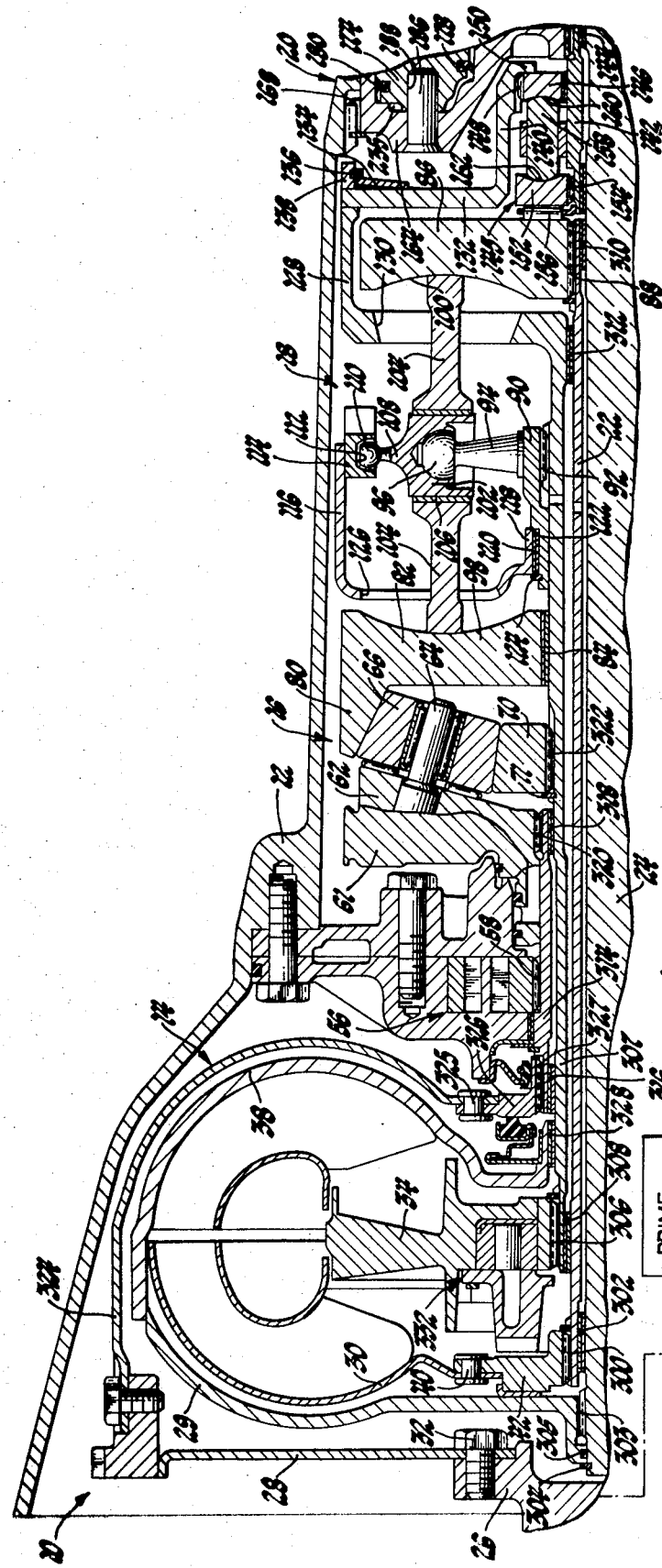
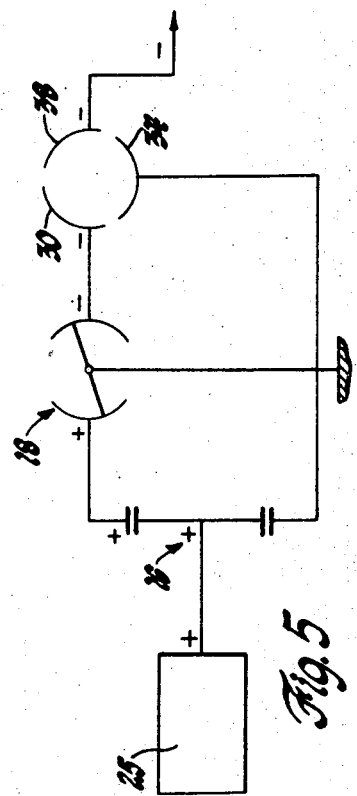
Fig.5
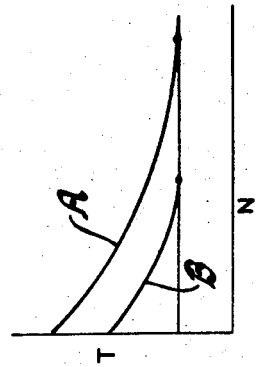
Fig.3
Fig.4
INVENTOR.
*Milton H. Schetter*
BY
*John P. Moran*
ATTORNEY

TRANSMISSION

This invention relates generally to transmissions and, more particularly, to a "Toric" roller-type transmission.

It is a general object of the invention to provide a toric roller-type drive, combined with a fixed ratio planetary traction-drive and including a fluid torque converter wherein the power input is split at the impeller, with a portion thereof being directed through the planetary traction-drive to overdrive the input race of the toric roller section, the planetary traction-drive serving as a torque-decreasing mechanism and thus eliminating the need for a large or double toric arrangement.

Another object of the invention is to provide a toric roller-type drive operating in conjunction with a fluid torque converter wherein the stator thereof is rotatable in a direction opposite to that of the impeller and the turbine by the output from the toric section for improved converter torque/speed ratio characteristics and more efficient coupling thereof, particularly at low engine speeds.

A further object of the invention is to provide a toric roller-type drive for which the reaction is via a non-rotating axial loader mechanism to the transmission housing.

A more specific object of the invention is to provide a toric roller-type drive and fluid torque converter wherein the power is split at the impeller and directed to the input race, with the output of the toric section directed to a stator having no overrunning clutch, to rotate the stator in a reverse direction, thereby increasing the relative velocities of the impeller and stator to provide added velocity to the fluid stream into the turbine for driving the transmission output shaft, with the direction of rotation thereof being the same as that of the engine output.

A still further object of the invention is to provide a toric roller-type drive combined with a fixed ratio planetary traction-drive wherein the planetary drive arrangement serves as a thrust bearing for the various frictional contacts while decreasing the torque being transmitted to the toric section.

These and other objects and advantages of the invention will be apparent when reference is made to the following description and accompanying drawings, wherein:

FIG. 1 is a cross-sectional view of a transmission embodying the invention;

FIG. 2 is a schematic diagram of the FIG. 1 structure;

FIG. 3 is a graph illustrating a characteristic of the invention;

FIG. 4 is a fragmentary cross-sectional view of another embodiment of the invention; and FIG. 5 is a schematic diagram of the FIG. 4 structure.

Referring now to the drawings in greater detail, FIG. 1 illustrates a transmission 10, including a casing 12 housing a fluid torque converter 14, a planetary traction-drive section 16, a toric section 18, and a reverse clutch mechanism 20, all of which are mounted around a sleeve shaft 22 which, in turn, is rotatably mounted on a central shaft 24.

Input from a suitable prime mover, represented generally at 25, to an input shaft 26 is transferred via an interconnected input flange member 28 and cover member 29 to the impeller 30 of the torque converter 14, the flange member 28 being connected to the input shaft 26 by bolts 32. The stator 34 of the torque converter 14 is secured by splines 36 to the input end of the sleeve shaft 22, while the turbine 38 thereof is connected by rivets 40 to a support member 42 which, in turn, is connected by splines 44 to the central shaft 24. The impeller 30 is fixed to one end of a sleeve member 46 which is rotatably mounted on the sleeve shaft 22 by bearings 48 and 50. A plurality of bearings 52 and 54 rotatably support the sleeve shaft 22 on the central shaft 24.

The sleeve member 46 drives an oil pump 56 via splines 58 and is connected at the output end thereof by splines 60 to drive a conventional input speed-controlled engine flyweight governor 61 and a carrier 62 of the planetary unit 16. The carrier 62 rotatably supports planet pinion shafts 64 on which conically contoured planet pinions 66 are rotatably mounted by needle bearings 68. A sun member 70 is restrained axially by a retainer ring 71 and secured by splines 72 to a fixed sleeve member 74, the latter being supported by bearings 76 and 78 on the sleeve shaft 22. A tapered outer ring 80, in rolling contact with the planet pinions 66, is formed as a part of an input race 82 of the toric section 18. The input race 82 is rotatably mounted on bearings 84 on the fixed sleeve member 74, while an output race 86 of the toric section 18 is secured by splines 88 to the sleeve shaft 22.

A support member 90, located intermediate the races 82 and 86, is secured by splines 92 to the sleeve member 74. A plurality of masts or stems 94 extend radially outwardly from the support member 90. A ball-end 96 is formed on each stem 94 intermediate the radial center of toroidal surfaces 98 and 100 formed on the input and output races 82 and 86, respectively. A carrier 102 is mounted on each ball-end 96, the latter serving as a universal pivot therefor. A roller 104 is rotatably mounted on bearings 106 on each carrier 102, the peripheral surface of each roller 104 being in frictional rolling contact with the toroidal surfaces 98 and 100. An extension 108 is formed on each carrier 102, extending radially outwardly therefrom and terminating in a ball-end 110. Each ball-end 110 is confined in a tapered slot or groove 112 formed in a member 114 secured to an annular lever 116. The annular lever 116 is rotatably mounted at a hub portion 118 thereof on bearings 120 on the fixed sleeve member 74 and fixed against axial displacement by a shoulder 122 formed on the sleeve member 74 and a retainer ring 124 also on the member 74. A plurality of openings 126 are formed in the annular lever 116 such that the respective rollers 104 may extend therethrough, with clearance for ratio-changing movement along the toroidal surface 98 of the input race 82. In operation, the support member 90, the lever 116 and the slotted member 114 are rotated by any suitable external means to cause the rollers 104 to first incline and then tilt in the conventional manner between the races 82 and 86.

A cup-shaped flange member 128 is formed on the output end of the sleeve member 74, extending radially past the toroidal surface 100 of the output race 86 and transversely past the outer periphery thereof toward the output end of the transmission 10. Openings 130 are formed in the flange member 128 such that the respective rollers 104 may extend therethrough and have clearance for ratio-changing movement along the toroidal surface 100. Another flange member 132 is mounted adjacent the output end of the flange member 128 and is urged into contact therewith by a Belleville-type spring 134, the latter abutting against a retainer ring 136 mounted in a groove formed on a fixed member 138. A hub portion 140 is formed on the sleeve member 132, extending toward the output end of the transmission 10 away from the back face of the output race 86 and spaced apart from a stationary sleeve member 142 aligned with the sleeve shaft 22. The stationary sleeve member 142 is supported by bearings 143 and 144 on the central shaft 24 and fixed against rotation by virtue of being splined by splines 166 to a fixed wall member 164 which, in turn, is splined by splines 168 to the housing 12. The wall member 164 is retained against axial movement by retainer rings 170 and 172 mounted on the stationary sleeve member 142 and the casing 12, respectively, adjacent the respective splines 166 and 168.

A stationary axial loader mechanism 145 is mounted intermediate the sleeve member 142 and the hub portion 140, a thrust member 146 thereof being connected by splines 148 to the hub portion 140 and being mounted on the sleeve member 142 adjacent a flange 150 formed on the hub portion 140. A fixed forward thrust member 152 is connected by splines 154 to the stationary sleeve member 142. Thrust bearings 156 are mounted between the adjacent faces of the fixed forward thrust member 152 and the rotatable output race 86. Rollers 158 are mounted between oppositely disposed ramp surfaces 160 and 162 formed on the thrust members 146 and 152, respectively. In response to changes in load conditions, the forward thrust member 152 remains fixed, while the rollers 158 and the other thrust member 146 move as required to compensate for the change in load, with the rollers 158 moving relative to the ramp surfaces 160 and 162.

The reverse clutch mechanism 20 is mounted between the output end of the fixed sleeve member 142 and the casing 12, adjacent the fixed wall member 164. A piston 174 is slidably mounted in a chamber 176 formed adjacent the wall member 164. Seals 178 and 180 are mounted between the piston 174 and the walls of the chamber 176. A spring 182, abutting against a fixed member 184, urges the piston 174 toward the wall member 164, the piston 174 being mounted at a central portion thereof on a pin 186 mounted in an opening 188 of the wall member 164. A clutch plate 190 is slidably mounted on splines 192 on a carrier member 194 rotatably mounted on the central shaft 24 by bearings 196. The clutch plate 190 has a conically shaped surface 198 located adjacent a like-shaped fixed member 200 mounted on the casing 12. Thrust bearings 202 are mounted between the carrier member 194 and the wall member 164 of the reverse clutch mechanism 20.

Thrust bearings 204 separate the member 194 from an inner ring or sun gear member 206 of a forward clutch assembly 208, the member 206 being connected by splines 209 to the central shaft 24. An outer ring member 210 is connected by splines 212 to a flange member 214 which, in turn, is connected to a hub portion 216 thereof by splines 218 to an output shaft 220.

Planet pinion members 222 are mounted in a chamber 224 intermediate the members 206 and 210 and are connected thereto by splines 226 and 228, respectively. Needle bearings 230 rotatably support the planet pinion members 222 on shaft members 232 which are mounted at the ends thereof on the carrier member 194 and an end plate 234.

In operation, suitable fluid is caused to flow through a passage 235 into the chamber 176 to the left (FIG. 1) of the piston 174, moving the piston 174 to the right to engage the double-conical surfaces between the piston 174, the clutch plate 190, and the fixed member 200. This locks up the carrier member 194, causing the sun gear member 206, rotated by the central shaft 24 via the splines 209, to rotate the planet pinion members 222 in place about the respective shaft members 232, thereby causing the outer ring member 210 to rotate about the planet pinion members 222 in a direction opposite to that of the sun gear member 206. This rotates the flange member 214, the hub portion 216 and the output shaft 220 in a direction opposite to that of the input shaft 26.

An annular member 236 is connected by splines 238 to the sun gear member 206. A plurality of forward clutch discs 240 are mounted on the annular member 236 for rotation therewith, while alternately spaced clutch disc 242 are secured to the flange member 214. An annular pressure plate or piston member 244 is mounted in a chamber 246 formed within the member 214 adjacent the clutch discs 240 and 242. A spring 248, mounted against an abutment 250 secured to the member 214, urges the pressure plate 244 away from the discs 240 and 242. Seals 252 and 254 are mounted between the pressure plate 244 and the wall surfaces of the chamber 246, within the flange member 214. An opening 256 is formed in the flange member 214. A one-way check valve 258 is mounted in the opening 256 against a seat 260. An extension housing 262 is secured at an outer flange 264 thereof to the casing 12 and mounted at an inner end 266 thereof on bearings 268 on the output shaft 220. The outermost end 270 of the extension housing 262 is rotatably supported on bearings 272 on an output sleeve 274 which is connected by suitable splines 276 to the output shaft 220.

In operation, suitable fluid is caused to flow through passages 278, 280, 282 and 284 to the chamber 246 to the right (FIG. 1) of the piston 244, causing the piston 244 to the left in FIG. 1 and engage the clutch discs 240 and 242. Since the clutch discs 240 are splined at their inner edges to the annular member 236 which, in turn, is splined to the sun gear member 206, and the clutch discs 242 and the outer ring member 210 are splined by splines 212 to the outer flange member 214, the sun gear member 206, planet pinion members 222 and the outer ring member 210 will operate in direct drive as a unit, thus rotating the outer flange member 214, the hub portion 216 and the output shaft 220 in direct drive with the input shaft 26.

If desired, teeth 286 may be formed on the output shaft 220 suitable for driving a governor drive gear (not shown), for vehicular speed control, in lieu of the engine speed governor 61 which is illustrated as being formed integrally with the traction-drive carrier 62.

The power flow of the transmission 10 will now be described. Assume that the input from the prime mover 25 to the input shaft 26 is in a clockwise or plus (+) direction, as viewed from the left end of FIG. 1 and as illustrated schematically in FIG. 2. Such clockwise rotation is transmitted via the flange member 28 to the impeller 30 of the torque converter 14 and thence via the sleeve member 46 to the carrier 62 of the planetary unit 16. Clockwise rotation of the carrier 62 will cause the planet pinions 66 to "walk around" the fixed sun member 70 in a clockwise direction, thus causing the outer ring member 80 to be rotated in a clockwise direction also. Since the ring member 80 is formed as an integral part of the input race 82, the latter likewise will be rotated in a clockwise direction. Rotation of the input race 82 will rotate the rollers 104 such that the output race 86 will be correspondingly rotated in a counterclockwise or negative (−) (FIG. 2) direction. Counterclockwise rotation of the output race 86 rotates the sleeve shaft 22 to cause the stator 34 of the torque converter 14 to rotate in a counterclockwise direction, i.e., in a direction opposite to that of the impeller 30 and the turbine 38. Such counterclockwise rotation of the stator 34 adds velocity to the fluid stream intermediate the impeller 30 and the turbine 38 to drive the turbine 38, the central shaft 24 and, with the forward clutch 208 engaged, the output shaft 220 in a clockwise direction, i.e., the same direction as the input shaft 26.

From the above, it may be noted that the torque imparted through the flange member 28 and the cover member 29 is split between the impeller 30 and the sleeve shaft 46 to the carrier 62 of the planetary unit 16. The planetary unit 16 thereupon serves as a speed-increasing mechanism, reducing torque as a reciprocal of speed and thus eliminating the need for a substantially larger toric section 18 in a given application. Additionally, since the planet pinions 66 are tapered and the contacting surface of the ring member 80 is angled to cooperate therewith, the planetary unit 16 also serves as a thrust bearing for the reaction of the axial loading through the toric section 18 and the stationary axial loader mechanism 145 to the housing 12.

With the stator 34 being driven in a direction opposite to that of the impeller 30 and the turbine 38, the usual overrunning clutch is omitted from the stator 34 structure. A very efficient coupling is obtainable by overdriving the stator, making possible the use of a smaller torque converter for a given application. Also, improved torque-speed characteristics are obtainable, for example, increased torque multiplication is possible over a substantially wider speed range, as illustrated by the torque/speed ratio curve "A" of FIG. 3 as compared to a conventional fluid torque converter "B". In other words, increased torque multiplication is available up to a substantially higher engine speed.

Referring now to the alternate embodiment of FIG. 4, all components which are similar to those of the FIG. 1 structure bear the same reference numerals. It may be noted in FIG. 4 that the impeller 30 and the turbine 38 are reversed in their locations within the torque converter 14 and that the impeller support member 42 is connected by splines 300 to the sleeve shaft 22, rather than to the central shaft 24 as in the FIG. 1 structure. A bearing 302 rotatably supports the input end of the sleeve shaft 22 on the central shaft 24. The cover member 29 is connected by splines 303 to the central shaft 24 and retained axially thereon by a retainer ring 304. A seal 305 is mounted between the splines 303 and the retainer ring 304.

The stator 34 is connected by splines 306 to a sleeve member 307 which replaces the sleeves 46 and 74 of FIG. 1. The sleeve member 307 is supported by bearings 308 on the sleeve shaft 22. Bearings 310 and 312 support the output ends of the sleeve shaft 22 and the sleeve member 307, respectively. Still another sleeve member 314 is rotatably supported by bearings 316 and 318 on the sleeve member 307. The flyweight governor 61, as well as the carrier 62 of the planetary unit 16, are connected by splines 320 to the sleeve member 314, while the sun member 70 is connected by splines 322 to an intermediate portion of the sleeve member 307.

The input flange member 28 is secured to a torque converter housing 324 which is connected by rivets 325 to a flange member 326 secured by splines 327 to the sleeve member 314. The housing 324 surrounds the turbine 38 which is rotatably supported at one end by bearings 328 on the sleeve member 307. An overrunning or sprag clutch 332 is associated with the stator 34 to control one-way rotation thereof.

With the above structural differences between FIGS. 1 and 4 in mind, power flow for the FIG. 4 embodiment will now be explained. Assume first that the direction of rotation imparted by the prime mover 25 to the input shaft 26 is in a clockwise or plus (+) direction, as viewed from the left end of FIG. 3 and as illustrated schematically in FIG. 5. Such clockwise rotation and all of the power input is transmitted via the flange member 28 and the fluid torque converter housing 324 to the sleeve member 314 and thence to the carrier 62 of the planetary unit 16, driving the planet pinions 66 in a clockwise direction about the fixed sun member 70. The planet pinions 66, being thus caused to "walk around" the sun member 70, drive the outer ring 80 and the associated input race 82 in a clockwise direction. Such clockwise rotation of the input race 82 will, through the rollers 104, cause the output race 86 to rotate in a counterclockwise or negative (−) (FIG. 5) direction. Counterclockwise rotation of the output race 86 causes the interconnected sleeve shaft 22 to rotate the impeller support member 42 and the impeller 30 in a counterclockwise direction. Such counterclockwise rotation of the impeller 30 causes the turbine 38 to rotate in the same direction. Since the cover member 29 is connected directly to the central shaft 24, the latter will also be caused to rotate in a counterclockwise direction. A cooperating forward clutch, such as the clutch 208 of FIG. 1, when engaged by any suitable external hydraulic means (not shown), drives the final output shaft 220 in a counterclockwise direction.

As indicated, the FIG. 4 embodiment includes an overrunning clutch 332 for cooperation with the stator 34, the latter rotating in the same direction as the impeller 30 and the turbine 38. There is no split torque, as all of the power goes through the overdriven fixed ratio planetary traction-drive section 16 wherein the torque is reduced into the single toric section 18. The output therefrom drives the converter impeller 30 as a function of toric speed ratio, thus providing a measure of external control over the input speed to the impeller 30 of the fluid torque converter 14. It may be noted in FIG. 4 that the stator 34, the sun member 70 and the toric support member 90 are all grounded through the reaction-sensitive axial loader mechanism 145.

It should be apparent that the invention provides novel means for decreasing engine torque prior to transfer to the toric section, with the output from the toric section being used in one embodiment to increase the relative velocities of the torque converter impeller and stator; and in another embodiment to directly increase the speed of the impeller, thereby, in both instances, providing for a more efficient coupling characteristic in the torque converter, particularly at low engine speeds. It may also be noted that in the first-mentioned embodiment increased torque multiplication is possible up to a substantially higher engine speed. In both embodiments the reaction for the sun member of the planetary traction-drive section and the support member for the toric section is through a nonrotating axial loader mechanism to the transmission housing.

While but two embodiments of the invention have been shown and described, other modifications thereof are possible.

I claim:

1. A transmission comprising a housing, input and central support shafts, a fluid torque converter including impeller, turbine, and stator members, first connector means for connecting said turbine member to said central support shaft, a toric roller section including oppositely disposed input and output races, a support member, a plurality of masts mounted on said support member, and a roller rotatably mounted on each mast and frictionally contacting said input and output races at the outer periphery of said roller, a sleeve member rotatably mounted around said central support shaft and connecting said output race to one of said stator and impeller members, a friction-drive planetary section including a sun member, a ring member, planet pinions rotatably mounted between said sun and ring members, and a carrier member for supporting said planet pinions, said ring member being operatively connected for rotation with said input race and said sun member being secured to said support member, and an axial loader mechanism mounted around said central support shaft and connecting said support member to said housing for loading said toric roller and planetary sections in response to torque.

2. A transmission comprising a housing, input, central support, and output shafts, a fluid torque converter including impeller, turbine, and stator members, first connector means for connecting said turbine member to said central support shaft, a toric roller section including oppositely disposed input and output races, a support member, a plurality of masts mounted on said support member, and a roller rotatably mounted on each mast and frictionally contacting said input and output races at the outer periphery of said roller, a sleeve member rotatably mounted around said central shaft and connecting said output race to one of said stator and impeller members, said support member being mounted around said sleeve member, a friction-drive planetary section including a sun member, a ring member for driving said input race at an increased speed over that of said input shaft, conically-shaped planet pinions rotatably mounted between said sun and ring members, and a carrier member for supporting said planet pinions, reaction means for connecting said support member to said housing, said ring member being secured to said input race and tapered to contact said conically-shaped planet pinions such that said planetary section serves as a thrust bearing means, said carrier member being operatively connected for rotation with said input shaft, and said sun member being secured to said support member, a stationary axial loader mechanism operatively connected to said reaction means for securing said sun member with respect to said housing and for loading said toric roller and planetary sections in response to torque, and clutch means for connecting said central shaft to said output shaft.

3. A transmission comprising a housing, input and central support shafts, a fluid torque converter including impeller, turbine, and stator members, first connector means for connecting said impeller member to said input shaft, second connector means for connecting said turbine member to said central support shaft, a toric roller section including oppositely disposed input and output races, disc roller means for driving said output race in a direction opposite to that of said input race and at a predetermined speed ratio therewith, third connector means for connecting said output race to said stator member, a friction-drive planetary section including a sun member, a ring member, planet pinions rotatably mounted between said sun and ring members, and a carrier member for supporting said planet pinions, said ring member being formed on said input race, fourth connector means for connecting said impeller member to said carrier member, reaction means for securing said sun member to said housing, said reaction means including a stationary axial loader mechanism operatively connected to said reaction means for securing said sun member with respect to said housing in response to load.

4. A transmission comprising a housing, input and central support shafts, a fluid torque converter including impeller, turbine, and stator members, first connector means for connecting said impeller member to said input shaft, second connector means for connecting said turbine member to said central support shaft, a toric roller section including oppositely disposed input and output races, a first sleeve member, a plurality of masts mounted on said first sleeve member, and a roller rotatably mounted on each mast and frictionally contacting said input and output races at the outer periphery thereof, a second sleeve member rotatably mounted on said central support shaft for connecting said output race to said stator member, said first sleeve member being mounted around said second sleeve member, a friction-drive planetary section including a sun member, a ring member, planet pinions rotatably mounted between said sun and ring members, and a carrier member for supporting said planet pinions, said sun member being secured to said first sleeve member, said ring member being formed on said input race, a third sleeve member rotatably mounted on said second sleeve member for connecting said impeller member to said carrier member and a stationary axial loader mechanism operatively connected between said first sleeve member and said housing for securing said sun member with respect to said housing in response to load.

5. A transmission comprising a fixed ratio planetary traction-drive section including sun, ring, carrier, and planet pinions rotatably supported by said carrier, a toric roller section including input and output races and intermediate disc roller mechanisms frictionally contacting said input and output races, said ring being operatively connected to said input race, and a fluid torque converter including impeller, turbine, and stator, input means to said impeller, first connector means connecting said impeller to said carrier of said planetary traction-drive section to cause said ring to overdrive said input race of said toric roller section, thereby reducing torque admitted into said toric roller section and, consequently, reducing the size requirements of said toric section, means for directing the output from said output race to said stator to rotate said stator in a direction opposite to that of said impeller and said turbine for controlling the relative speeds of said stator and said impeller and thereby effecting torque multiplication at higher input speeds, axial loader means for transmitting the reaction on said sun and said disc roller mechanisms to ground, and second connector means securing said sun to said axial loader means.

6. A traction-drive transmission comprising a housing, input, central, and output shafts, a fluid torque converter including impeller, turbine, and stator, first connector means for interconnecting said impeller and said input shaft, a planetary carrier member, second connector means for interconnecting said carrier member and said impeller, a plurality of planet pinions rotatably supported by said carrier member, sun and ring members frictionally contacting said planet pinions, reaction means (74, 128, 132, 146, 148, 152, 154, 142, 166, 164, 168) for connecting said sun member to said housing, oppositely disposed toroidal-shaped input and output races, a plurality of rollers intermediate and frictionally contacting said input and output races, said ring member being integral with said input race, third connector means for interconnecting said output race and said stator for driving said stator in a direction opposite to that of said impeller and turbine to add velocity to the fluid stream in said fluid torque converter, fourth connector means for interconnecting said turbine and said central shaft, and clutch means for operatively connecting said central shaft to said output shaft.

7. The transmission described in claim 6, wherein said reaction means for connecting said sun member to said housing includes an axial loader mechanism having oppositely disposed nonrotating ramp members and an intermediate roller movable relative to at least one of said ramp members as required to compensate for load conditions.

8. A traction-drive transmission comprising a housing, input and central support shafts, a fluid torque converter including impeller, turbine, and stator members, a planetary carrier member, first connector means for interconnecting said carrier member and said input shaft, a plurality of planet pinions rotatably supported by said carrier member, sun and ring members frictionally contacting said planet pinions, second connector means connected at one end thereof to said sun member, axial loader means for interconnecting the other end of said second connector means and said housing, oppositely disposed toroidal-shaped input and output races, a plurality of rollers frictionally contacting said input and output races, said ring member being connected to drive said input race, third connector means for interconnecting said output race and said impeller member for variably controlling the speed of rotation of said impeller member, and fourth connector means for interconnecting said turbine member and said central support shaft, and output means operatively connected to said central support shaft.

9. A transmission comprising a housing, input and output shafts, a fluid torque converter including impeller, turbine, and stator members, a toric roller section including oppositely disposed input and output races, a support member, a plurality of masts mounted thereon, and a roller rotatably mounted on each mast and frictionally contacting said input and output races at the outer periphery thereof, sleeve shaft connector means for connecting said output race to said impeller member, said support member being mounted around said sleeve shaft connector means, a friction drive planetary section including a sun member, a ring member, planet pinions rotatably mounted between said sun and ring members, and a carrier member for supporting said planet pinions, said sun member being secured to said support member, said ring member being formed on said input race, second connector means for connecting said carrier member to said input shaft, and a stationary axial loader mechanism operatively connected between said support member and said housing for securing said sun member to said housing during load conditions.

* * * * *